United States Patent
Chen et al.

(10) Patent No.: US 9,723,099 B2
(45) Date of Patent: Aug. 1, 2017

(54) SCREEN SHARING CACHE MANAGEMENT

(71) Applicant: Cisco Technology Inc., San Jose, CA (US)

(72) Inventors: Sijia Chen, Hangzhou (CN); Xing Jin, Shanghai (CN); Volvet Zhang, Hangzhou (CN); Rui Zhang, Pleasanton, CA (US); Mengkang Wang, Hangzhou (CN)

(73) Assignee: Cisco Technology, Inc., San Jose, CA (US)

( * ) Notice: Subject to any disclaimer, the term of this patent is extended or adjusted under 35 U.S.C. 154(b) by 266 days.

(21) Appl. No.: 14/272,821

(22) Filed: May 8, 2014

(65) Prior Publication Data

US 2015/0312370 A1    Oct. 29, 2015

(30) Foreign Application Priority Data

Apr. 28, 2014    (CN) .......................... 2014 10175800

(51) Int. Cl.
*G06F 15/167* (2006.01)
*H04L 29/08* (2006.01)

(52) U.S. Cl.
CPC ................ *H04L 67/2852* (2013.01)

(58) Field of Classification Search
CPC .. H04L 67/2852; H04L 67/2842; H04L 67/10
See application file for complete search history.

(56) References Cited

U.S. PATENT DOCUMENTS

| 7,584,201 B2 * | 9/2009 | Casey ................ G06F 21/6209 |
| 2008/0008211 A1 * | 1/2008 | Zilbershtein ........ H04L 67/2823 370/466 |

(Continued)

FOREIGN PATENT DOCUMENTS

| JP | 2005269272 (A) | 9/2005 |
| JP | 2008236553 (A) | 10/2008 |

(Continued)

OTHER PUBLICATIONS

Christian Spielvogel et al., "Collaborative Quality-of-Service Based Video Conferencing," *Proceedings of the 2010 Int'l Conference on Computer Supported Cooperative Work in Design*, pp. 161-165 (IEEE 2010).

*Primary Examiner* — Tauqir Hussain
*Assistant Examiner* — Michael A Keller
(74) *Attorney, Agent, or Firm* — Samuel M. Katz (57) ABSTRACT

In one embodiment, a managed cache system, includes a cache memory to receive storage units via an uplink from a transmitting client, each storage unit including a decodable video unit, each storage unit having a priority, and enable downloading of the storage units via a plurality of downlinks to receiving clients, and a controller processor to purge the cache memory of one of the storage units when all of the following conditions are satisfied: the one storage unit is not being downloaded to any of the receiving clients, the one storage unit is not currently subject to a purging exclusion, and another one of the storage units now residing in the cache, having a higher priority than the priority of the one storage unit, arrived in the cache after the one storage unit. Related apparatus and methods are also described.

20 Claims, 9 Drawing Sheets

(56) References Cited

U.S. PATENT DOCUMENTS

| | | |
|---|---|---|
| 2011/0310217 A1 | 12/2011 | Lee et al. |
| 2013/0141517 A1 | 6/2013 | Shen et al. |
| 2013/0166650 A1 | 6/2013 | Chen et al. |
| 2014/0009563 A1* | 1/2014 | Leske .................... H04N 7/141 348/14.08 |
| 2014/0019418 A1* | 1/2014 | Chu .................. H04M 1/72522 707/654 |
| 2014/0086155 A1* | 3/2014 | Chen .................... H04B 7/0626 370/329 |

FOREIGN PATENT DOCUMENTS

| | | |
|---|---|---|
| JP | 05003217 B2 | 8/2012 |
| WO | WO 02/102083 A1 | 12/2002 |

* cited by examiner

SCREEN SHARING CACHE MANAGEMENT

The present application claims the benefit of the filing date of CN 2014 10175800.7 filed 28 Apr. 2014.

FIELD OF THE INVENTION

The present invention relates to screen sharing, and in particular, to management of a screen sharing cache.

BACKGROUND OF THE INVENTION

By way of introduction, real-time screen sharing has become a must-have feature in many collaboration products. This popularity, along with the booming of mobile devices has brought new challenges for the collaboration products. Collaboration products typically require interoperability with different types of devices, service providers and products, concurrency to support multi-point communication and adaptability to enhance business value to both the provider and customers.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A managed cache system, including a cache memory to receive a plurality of storage units via an uplink from a transmitting client, each of the storage units including a decodable video unit, each of the storage units having a priority selected from a plurality of priorities, and enable downloading of the storage units via a plurality of downlinks to a plurality of receiving clients such that there is one of the downlinks for one of the receiving clients, and a controller processor to purge the cache memory of one of the storage units when all of the following conditions are satisfied: the one storage unit is not being downloaded to any of the receiving clients, the one storage unit is not currently subject to a purging exclusion and another one of the storage units now resides in the cache and arrived in the cache after the one storage unit and has a priority which is higher than the priority of the one storage unit.

Description Continued

Figure 1:
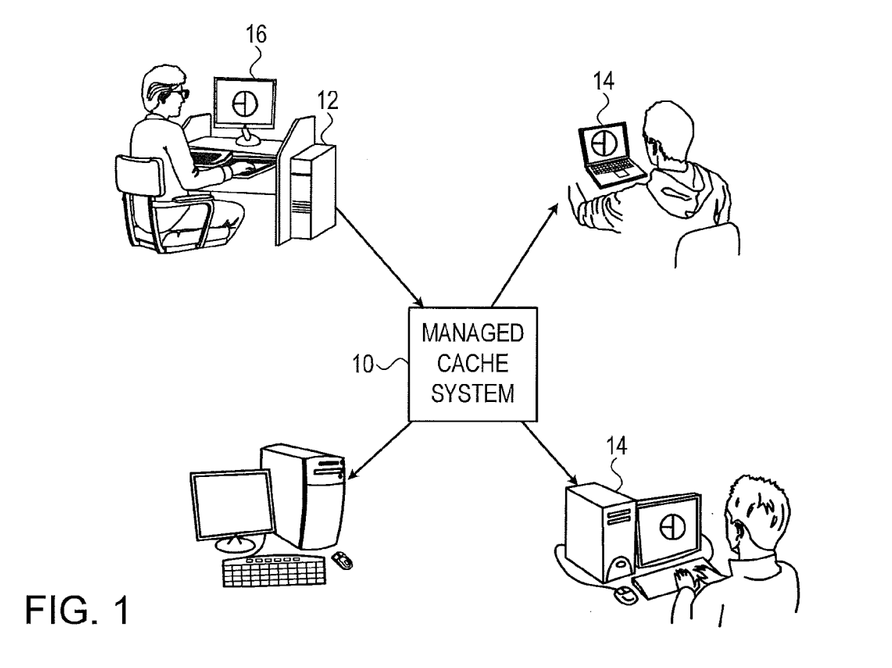
FIG. 1 is a partly pictorial, partly block diagram view of a managed cache system constructed and operative in accordance with an embodiment of the present invention.

Reference is now made to FIG. 1, which is a partly pictorial, partly block diagram view of a managed cache system 10 constructed and operative in accordance with an embodiment of the present invention.

FIG. 1 shows a client 12 sharing a screen 16 with another two clients 14. The screen sharing is facilitated via the managed cache system 10. It will be appreciated that the contents of the screen 16 may change frequently or may be static for an extended period of time.

The managed cache system 10 may enhance collaboration product interoperability when some type of standardized video format is used to transmit the screen contents. Standardized video format may require a lot more bandwidth than private video formats. It should be noted that the managed cache system 10 may alternatively be implemented using a private video format.

The managed cache system 10 may enhance collaboration product adaptability to the processing and upload/download capacity of the various clients and enhance network stability as will be described in more detail below with reference to FIGS. 3-19.

Figure 2:
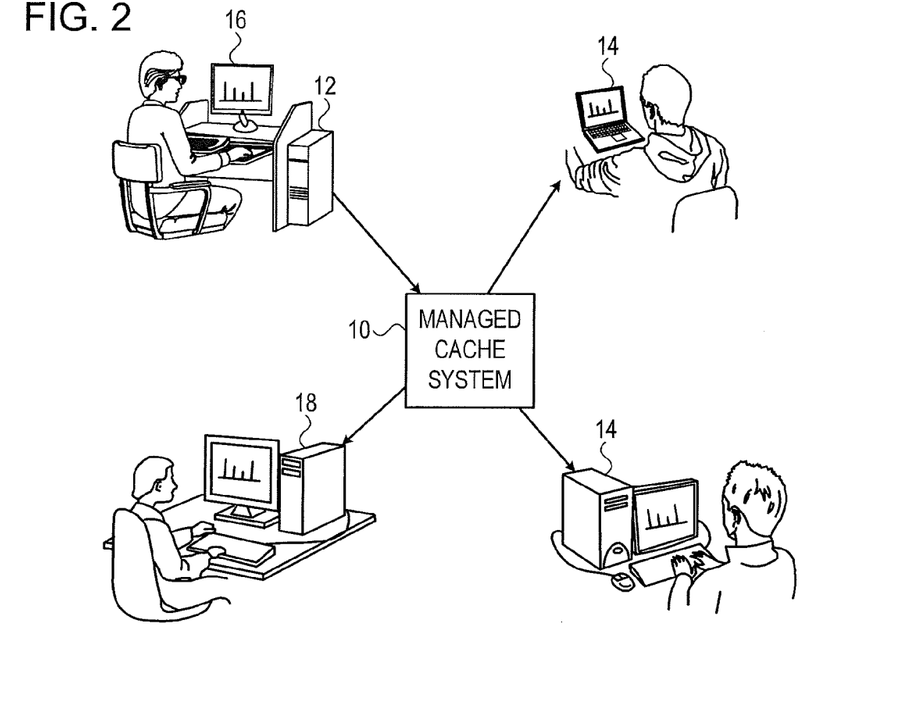
FIG. 2 is a partly pictorial, partly block diagram view of the managed cache system of FIG. 1 showing the joining of a new client.

Reference is now made to FIG. 2, which is a partly pictorial, partly block diagram view of the managed cache system 10 of FIG. 1 showing the joining of a new client 18.

The managed cache system 10 may enhance collaboration product concurrency by a well-designed mechanism avoiding degradation of service quality when new client(s) 18 participate in the communication as will be described in more detail below with reference to FIGS. 3-19. The managed cache system 10 typically handles requests of individual clients 14, 18 while minimizing degradation to the overall user experience of the collaboration system. The managed cache system 10 typically tries to minimize the dependency between the receiving clients 14, 18 and the transmitting client 12 by the transmitting client 12 relying as little as possible on feedback from the receiving clients 14, 18, but at the same time fulfilling requests from individual receiving clients 14, 18 as will be described in more detail with reference to FIGS. 3-19.

New client(s) 18 typically require a random access point as a starting point from which to decode the video representing the screen 16 of the transmitting client 12. Quick responses to random access points, especially to newly-joined client(s) 18, can become a shining point of a collaboration product. On the other hand, sending out new random access points may adversely impact all existing attendees 12, 14. The managed cache system 10 has a unique approach to dealing with the availability of random access points as will be described below in more detail with reference to FIGS. 3-19.

Figure 3:
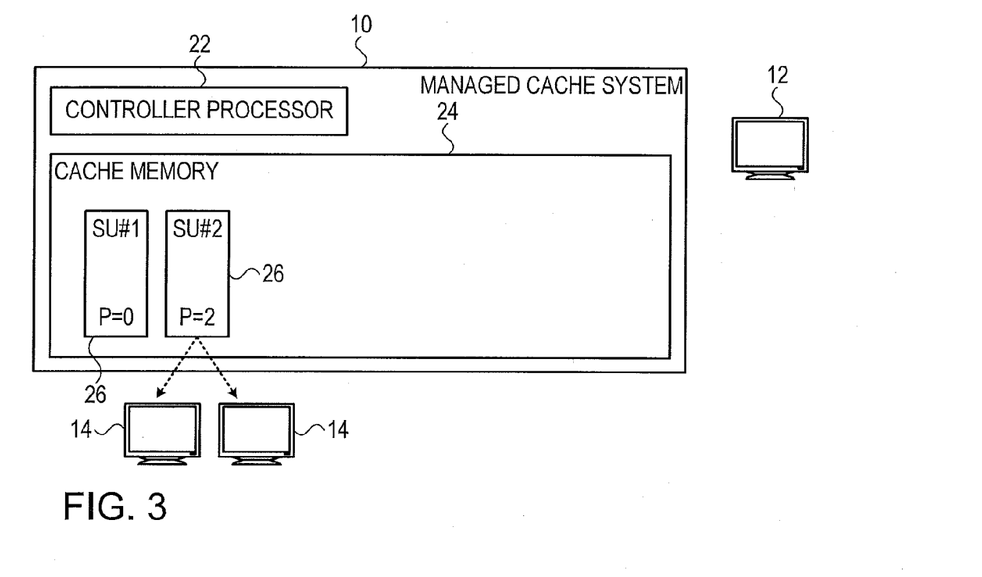
FIG. 3 is a partly pictorial, partly block diagram view of two client downloading a storage unit from the managed cache system of FIG. 1.

Reference is now made to FIG. 3, which is a partly pictorial, partly block diagram view of two clients 14 downloading a storage unit 20 from the managed cache system 10 of FIG. 1.

The managed cache system 10 includes a controller processor 22 and a cache memory 24.

The cache memory 24 is typically operative to receive a plurality of storage units (SUs) 26 via an uplink from the transmitting client 12. FIG. 3 shows two storage units 26 (SU#1 and SU#2) which were previously received via the uplink from the transmitting client 12. Each of the storage units 26 typically includes at least one decodable video unit or video frame or slice. By way of example, when the H.264 video encoding standard is employed, one storage unit 26 typically includes one Access Unit (AU) and if the RTP packetization standard is used, each storage units 26 typically includes one or more RTP packets of the AU.

Each of the storage units 26 typically has a priority selected from a plurality of priorities. FIG. 3 shows that SU#1 has a priority P of 0 and SU#2 has a priority P of 2.

In the examples of FIGS. 3-19, priority 0 is the highest priority, priority 1 is the next highest priority, and so on.

The cache memory 24 is typically operative to receive the storage units 26 via the uplink from the transmitting client 12 with the priority of the storage units 26 already assigned to each of the storage units 26. The priorities may be assigned by an encoder (not shown) in the transmitting client 12 or in another element operationally connected to the encoder.

Alternatively, the priorities may be assigned by the managed cache system 10 or by an element operationally disposed between the transmitting client 12 and the managed cache system 10 by way of example only.

PCT Patent Application System WO 2002102083 of Koninkl Philips Electroninc NV entitled "System and method for creating multi-priority streams" describes a method for assigning priority to video frames encoded according to the MPEG-2 video encoding standard.

In H.264/AVC, an intuitive way to assign frame priority is to map the priority from the value of the syntax "nal_ref_idc". When nal_ref_idc is 0, the frame is not taken as reference, so it should be assigned a lower priority than the frames with nal_ref_idc greater than 0. Slice type can also be used to assign the priority. IDR frames could be assigned the highest priority, while P frames could be assigned the priority lower than IDR frames but higher than B frames. Priority could be mapped with the temporal id of each frame.

In H.265, priority could be mapped with the NAL type in frames.

In H.264/H.265, long term reference (LTR) frames can be assigned with a higher priority than ordinary P/B frames, since there is no single syntax to indicate LTR frames in bit stream.

The cache memory 24 is typically operative to enable downloading of the storage units 26 via a plurality of downlinks from the cache memory 24 to a plurality of receiving clients 14 such that there is one downlink for each receiving client 14. The downlink from the cache memory 24 to the receiving clients 14 may also be via a secondary server(s) or (super) node(s) in a cascading network structure, by way of example only.

The controller processor 22 is operative to store the received storage units 26 in the cache memory 24 according to a time of receipt of the received storage units 26 in the cache memory 24.

FIG. 3 shows both receiving clients 14 concurrently downloading the same storage unit 26 (SU#2).

Once a receiving client 14 has completed download of a particular storage unit 26, the receiving client 14 then proceeds to download a newer storage unit 26 which has the highest priority in the cache memory 24 of the newer storage units 26. Newer storage units 26 are defined as storage units 26 which arrived after the particular storage unit 26. So if the next storage unit 26 has priority 3 and a subsequent storage unit 26 has a priority 2, then the receiving client 14 will skip downloading the priority 3 storage unit 26 and proceed to download the priority 2 storage unit 26. This behavior is shown clearly illustrated with reference to FIGS. 5-19 and in particular with reference to FIGS. 14 and 15. It should be noted that skipping downloading one of the storage units 26 may occur before starting to download that storage unit 26 or even while downloading that storage unit 26 so that the download of that storage unit is canceled in favor of downloading a higher priority newer storage unit 26.

The controller processor 22 is operative to maintain a count of the number of concurrent downloads of each of the storage units 26 resident in the cache memory 24. In other words, the count of a particular storage unit 26 will increase by 1 when a receiving client 14 begins to download the storage unit 26 and reduce by 1 when the receiving client 14 finishes downloading the storage unit 26. It should be noted that finishing downloading does not necessary mean successfully downloading all the data of the storage unit 26. Instead of maintaining a count of the number of concurrent downloads, the controller processor 22 may be operative to maintain a list of the downloads for each of the storage units 26 resident in the cache memory 24.

It can be seen from the above that the transmitting client 12 is generally operative to share display screen content with the receiving clients 14 using the storage units 26 via the managed cache system 10. The transmitting client 12 is generally operative to transmit a new storage unit 26 to the cache memory 24 if the screen content changes whereas if the screen content does not change, the transmitting client 12 does not generally generate any storage units 26 for transmitting to the cache memory 24.

Purging of the cache memory 24 is now described.

The controller processor 22 is operative to purge the cache memory 24 of a storage unit 26 when all of the following conditions are satisfied: (a) the storage unit 26 is not being downloaded to any of the receiving clients 14; (b) the storage unit 26 is not currently subject to a purging exclusion; and (c) another storage unit 26 now residing in the cache memory 24, having a higher priority than the priority of the storage unit 26, arrived in the cache memory 24 after the storage unit 26 (but not necessarily immediately after the storage unit 26). Purging exclusion is described in more detail with reference to FIG. 19.

FIG. 3 does not show any of the storage units 26 being purged from the cache memory 24 as SU#1 has the highest priority (priority 0) and SU#2 is being downloaded. A priority 0 storage unit 26 is generally only purged when another priority 0 storage unit 26 is successfully received by the cache memory 24.

The managed cache system 10 may be implemented with a hybrid video coding scheme according to any suitable video encoding standard, such as H.264/AVC, H.265 by way of example only, or in accordance with a private encoding scheme.

The managed cache system 10 generally separates the requirements of the transmitting client 12 from requests from the receiving clients 14, thereby allowing for maximum concurrency.

The managed cache system 10 can adapt to the needs of different receiving clients 14 based on the managed cache system 10 usage and purging rules.

The above aspects are illustrated in more detail with reference to FIGS. 4-19.

Figure 4:
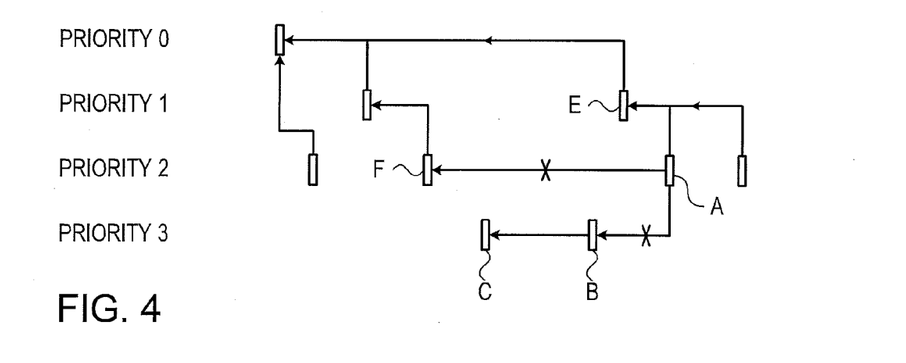
FIG. 4 is a partly pictorial, partly block diagram view illustrating video decoding dependency rules in the managed cache system of FIG. 1.

Reference is now made to FIG. 4, which is a partly pictorial, partly block diagram view illustrating video decoding dependency rules in the managed cache system 10 of FIG. 1.

A hybrid video coding scheme achieves high coding efficiency by using inter-prediction but introduces dependency between frames. When a hybrid video encoder is used to encode the screen content, the relations of inter-prediction may be aligned with the priority according to some suitable rules, for example, but not limited to, the rules recited below. It will be appreciated by those ordinarily skilled in the art that it is possible that without dependency/priority rules, bit streams produced by hybrid video coding scheme can also work properly with the managed cache system 10, but in such a case, more delicate control of the managed cache system 10 may be needed so as to avoid error propagation caused by storage units 26 purging. Delicate control may be achieved by flexibly enabling/disabling different purging exclusion rules at different periods. Purging exclusion is described in more detail below with reference to FIG. 19.

In a hybrid video encoding scheme the following rules could be applied:

(a) Each storage unit 26 should not depend, for video decoding purposes, on lower priority storage unit(s) 26. For an example, see frames A and B in FIG. 4.

(b) Storage units 26 may depend on the storage units 26 with the same priority but not on ones before a storage unit(s) 26 with a higher priority. In other words, a storage unit X may be dependent for video decoding purposes on one or more storage units Y having the same priority as the storage unit X as long as the cache memory 24 does not include any storage unit(s) Z having a higher priority than the storage unit X received in the cache memory 24 before the storage unit X and received after the storage unit(s) Y. For example, see frames B and C in FIG. 4 which is legal according to this rule and see frames A, E and F which is illegal according to this rule.

(c) The storage units 26 including an independently decodable video unit are assigned to the highest priority. For example, IDR frames in H.264 standard and I-frames in MPEG-2 are assigned priority 0.

Figure 5:
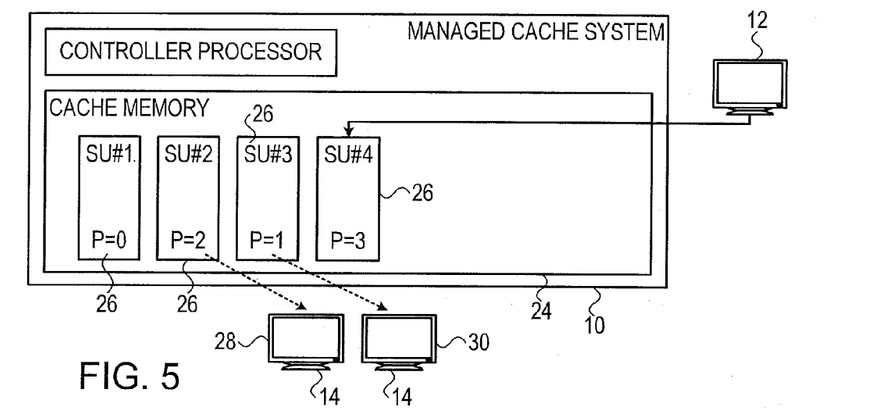
FIG. 5 is a partly pictorial, partly block diagram view of the two clients of FIG. 3 downloading two different storage units while a transmitting client is uploading a storage unit to the managed cache system of FIG. 1.

Reference is now made to FIG. 5, which is a partly pictorial, partly block diagram view of the two clients 14 of FIG. 3 downloading two different storage units 26 while the transmitting client 12 is uploading a storage unit 26 to the managed cache system 10 of FIG. 1.

A receiving client 28 (one of the receiving clients 14) is downloading SU#2 slower than a receiving client 30 (one of the receiving clients 14). So while the receiving client 28 is still downloading SU#2, the receiving client 30 has finished downloading SU#2 and subsequently started downloading SU#3.

At the same time, the transmitting client 12 is uploading SU#4 to the cache memory 24.

Figure 6:
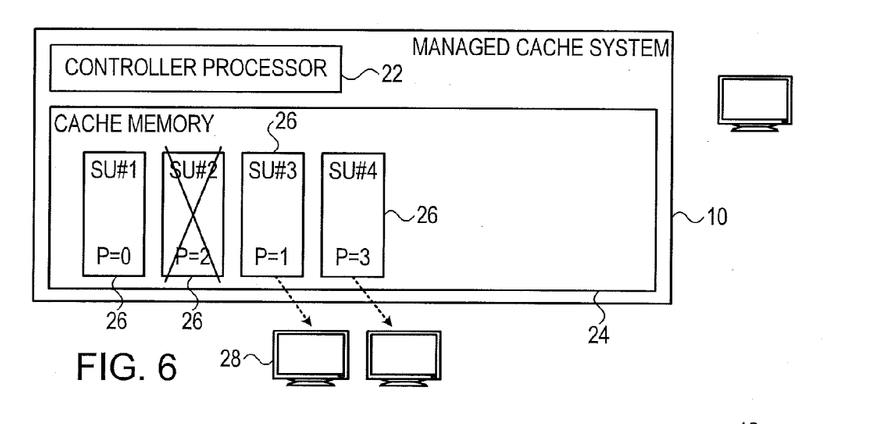
FIG. 6 is a partly pictorial, partly block diagram view showing one of the storage units being purged in the managed cache system of FIG. 1.

Reference is now made to FIG. 6, which is a partly pictorial, partly block diagram view showing one of the storage units 26 (SU#2) being purged in the managed cache system 10 of FIG. 1.

Once the receiving client 28 has finished downloading SU#2, SU#2 can be purged from the cache memory 24 by the controller processor 22, as a storage unit 26 (SU#3) which is newer and has a higher priority than SU#2 now resides in the cache memory 24.

Figure 7:
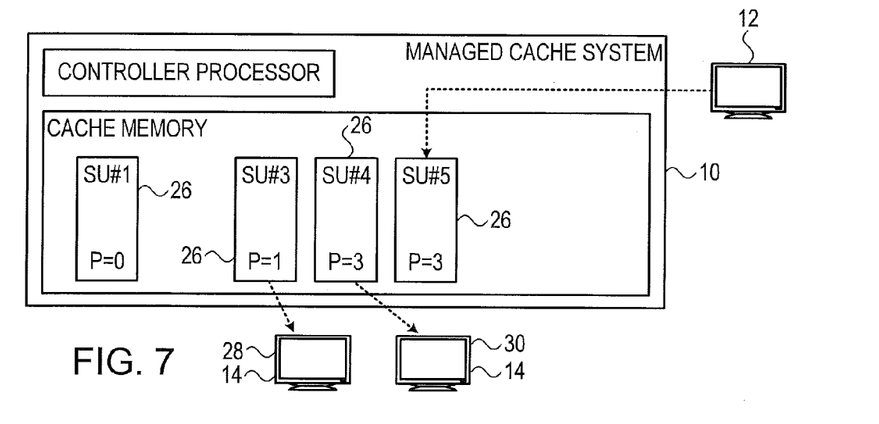
FIG. 7 is a partly pictorial, partly block diagram view of the two clients of FIG. 3 downloading two storage units while the transmitting client of FIG. 3 is uploading another storage unit to the managed cache system of FIG. 1.

Reference is now made to FIG. 7, which is a partly pictorial, partly block diagram view of the two clients 28, 30 (collectively labeled with reference numeral 14) of FIG. 3 downloading two storage units 26 (SU#3 and SU#4) while the transmitting client 12 of FIG. 3 is uploading another storage unit 26 (SU#5) to the managed cache system 10 of FIG. 1. It should be noted that the uploading and downloading of the storage units 26 does not generally require any interaction between the receiving clients 14 and the transmitting client 12.

Figure 8:
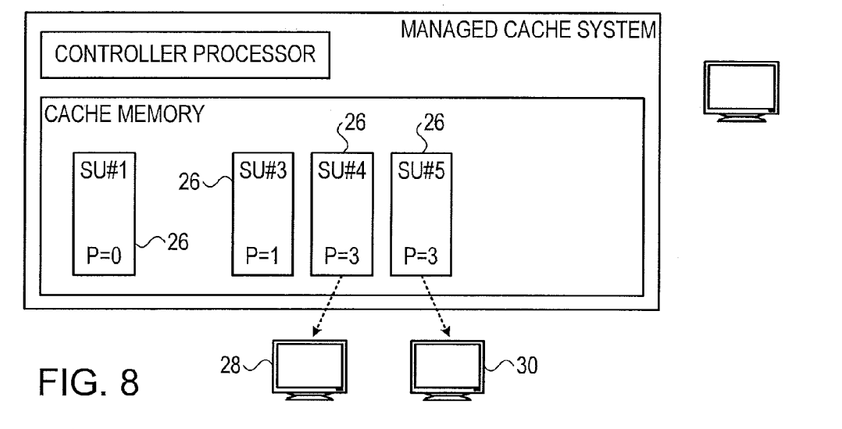
FIG. 8 is a partly pictorial, partly block diagram view of the two clients of FIG. 3 downloading two storage units.

Reference is now made to FIG. 8, which is a partly pictorial, partly block diagram view of the two clients 28, 30 downloading two storage units 26 (SU#4 and SU#5, respectively). FIG. 8 shows that each receiving client 28, 30 moves on to the next available storage unit 26 for download. When the receiving client 28 finishes downloading SU#4, the receiving client 28 will proceed to download SU#5. If there was a newer higher priority storage unit 26 then the receiving clients 28, 30 would skip to that one for download instead of SU#4 and SU#5.

Figure 9:
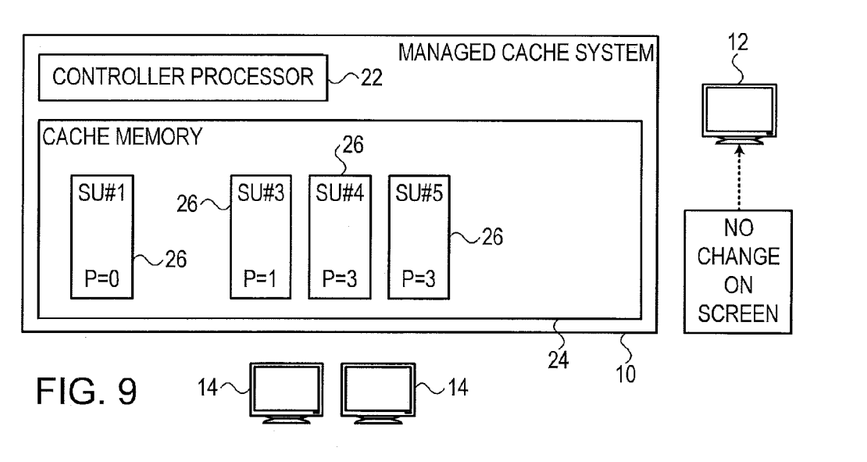
FIG. 9 is a partly pictorial, partly block diagram view of a static state situation in the managed cache system of FIG. 1.

Reference is now made to FIG. 9, which is a partly pictorial, partly block diagram view of a static state situation in the managed cache system 10 of FIG. 1.

The screen at the transmitting client 12 has not changed and the transmitting client 12 has not generated any new storage units 26 for transmitting to the managed cache system 10. Nevertheless, based on the purging rules, the storage units 26 (SU#1, SU#3, SU#4 and SU#5) are not purged from the cache memory 24 by the controller processor 22 even if there is a long delay after receiving the latest storage unit 26. Therefore, any newly joining receiving clients 14 will be able to download the storage units 26 from the cache memory 24 in order to recreate the screen content which is being displayed by the transmitting client 12. Therefore, the managed cache system 10 is able to support a non-steady frame rate or non-regular distribution of frames by the transmitting client 12. The transmitting client 12 therefore saves processing power and bandwidth. Additionally, as storage units 26 are typically not sent when the screen content does not change, newly joining clients have fewer storage units 26 to download in order to catch up to the same screen content as shown at the transmitting client 12.

Figure 10:
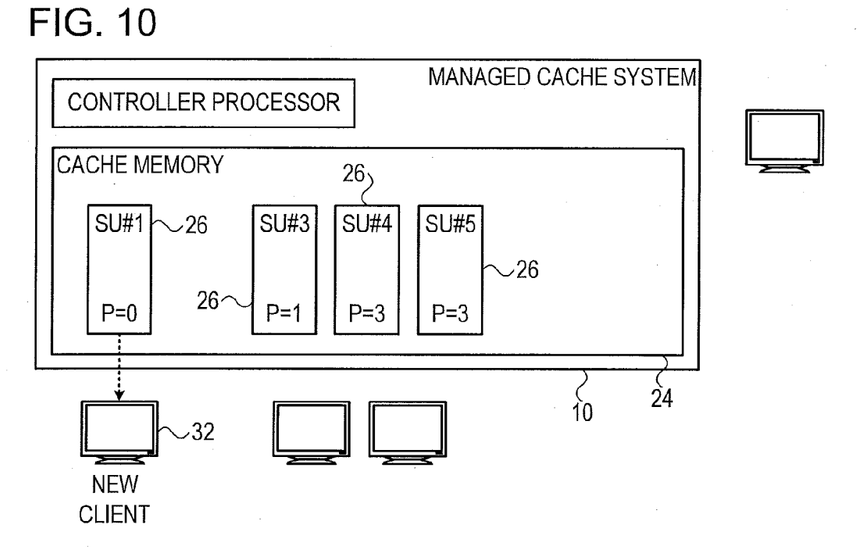
FIG. 10 is a partly pictorial, partly block diagram view of a new client joining during the static state situation in the managed cache system of FIG. 1.

Reference is now made to FIG. 10, which is a partly pictorial, partly block diagram view of a new client 32 joining during the static state situation in the managed cache system 10 of FIG. 1.

The new client 32 starts downloading SU#1 which is the random access point to the video sequence included in storage units 26 stored in the cache memory 24.

Figure 11:
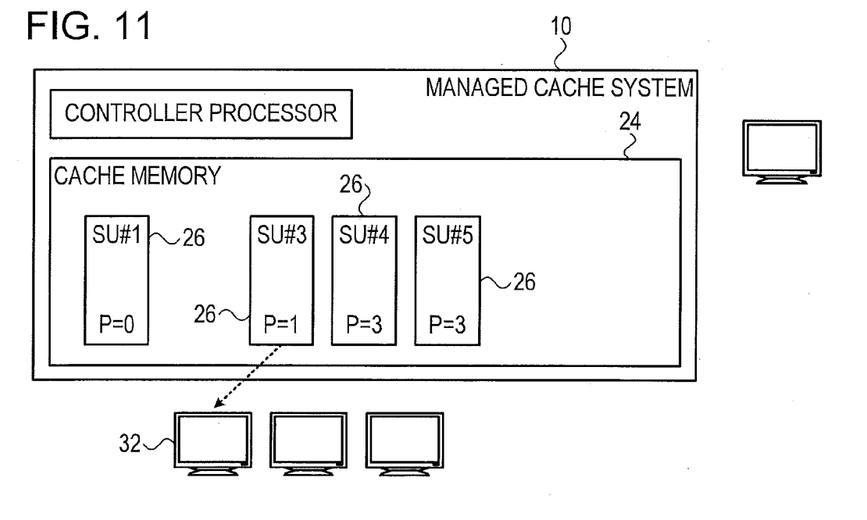
FIG. 11 is a partly pictorial, partly block diagram view of the new client of FIG. 10 downloading the next storage unit from the managed cache system of FIG. 1.

Reference is now made to FIG. 11, which is a partly pictorial, partly block diagram view of the new client 32 of FIG. 10 downloading the next storage unit 26 (SU#3) from the managed cache system 10 of FIG. 1.

After downloading SU#1, the client 32 proceeds to download the next highest priority storage unit 26 in the cache memory 24, namely SU#3 with priority 1.

Figure 12:
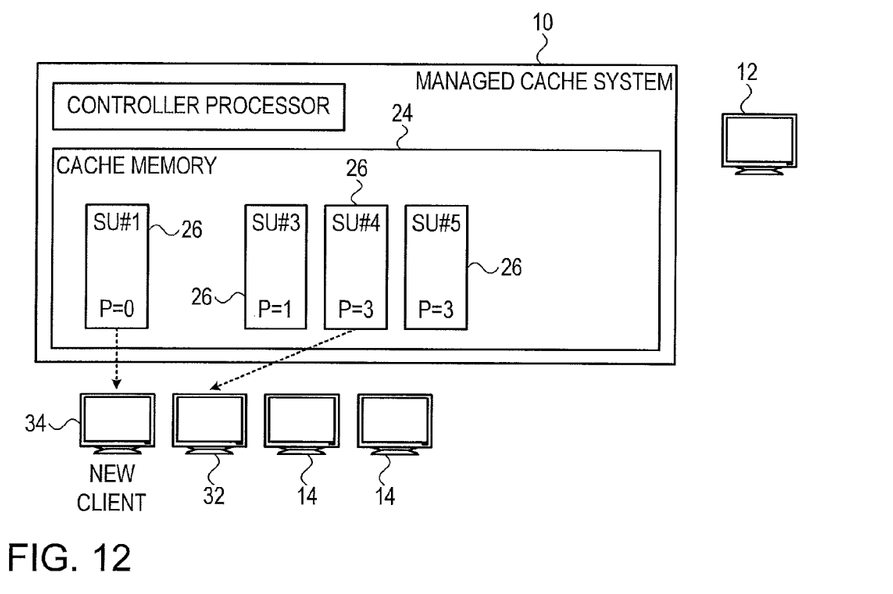
FIG. 12 is a partly pictorial, partly block diagram view of another new client joining during the static state situation in the managed cache system of FIG. 1.

Reference is now made to FIG. 12, which is a partly pictorial, partly block diagram view of another new client 34 joining during the static state situation in the managed cache system 10 of FIG. 1.

FIG. 12 shows responding to a request from the new client 34. The client 34 starts downloading from SU#1 with priority 0 while the client 32 continues with SU#4. The example of FIG. 12 should be compared with the example of FIG. 18 where a new client is shown downloading a priority 0 storage unit 26 which is newer than the other storage units 26 in the cache memory 24.

The client 34 will continue to download the other storage units 26 (SU#1 and so on) to catch up with the other receiving clients 14, 32.

It should be noted that in the example of FIG. 12 (and FIG. 18), there is always a priority 0 storage unit 26 and all the storage units 26 needed by the new client to capture the screen content being displayed by the transmitting client 12. The action of the client 34 joining the screen sharing does not prevent the transmitting client 12 uploading new storage units 26 and the receiving clients 14, 32 downloading the storage units 26 that are needed to capture the screen content being displayed by the transmitting client 12. The above generally provides a better user experience especially in large-scale conferencing when joining or continuous key picture requests are frequent.

It should be noted that it is possible that the new client 34 joining may trigger the transmitting client 12 (for example, by the managed cache system 10 sending a request to the transmitting client 12) to upload a new key picture (random access point) to the cache memory 24. However, it will be appreciated that such functionality may cause some system degradation.

Figure 13:
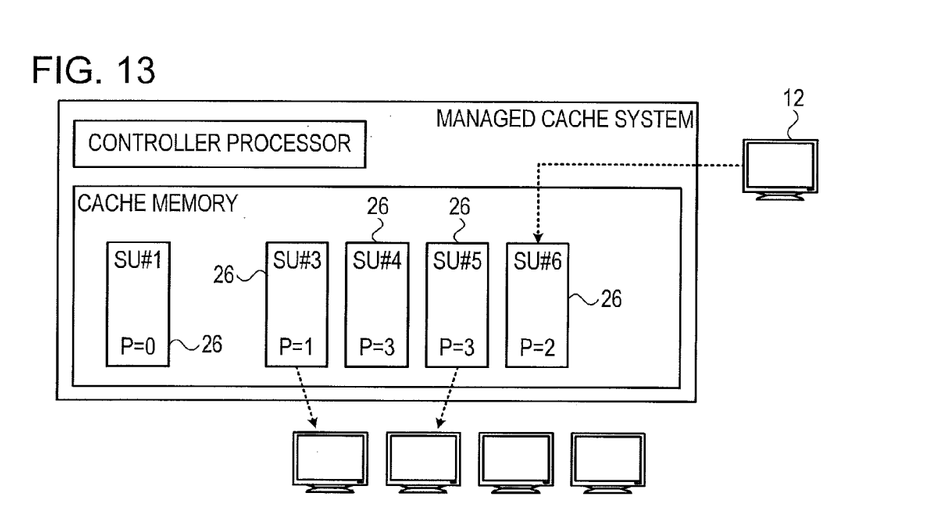
FIG. 13 is a partly pictorial, partly block diagram view of a new storage unit being uploaded to the managed cache, system of FIG. 1.

Reference is now made to FIG. 13. FIG. 13 shows a new storage unit 26 (SU#6) being uploaded to the managed cache system of FIG. 1 by the transmitting client 12.

Figure 14:
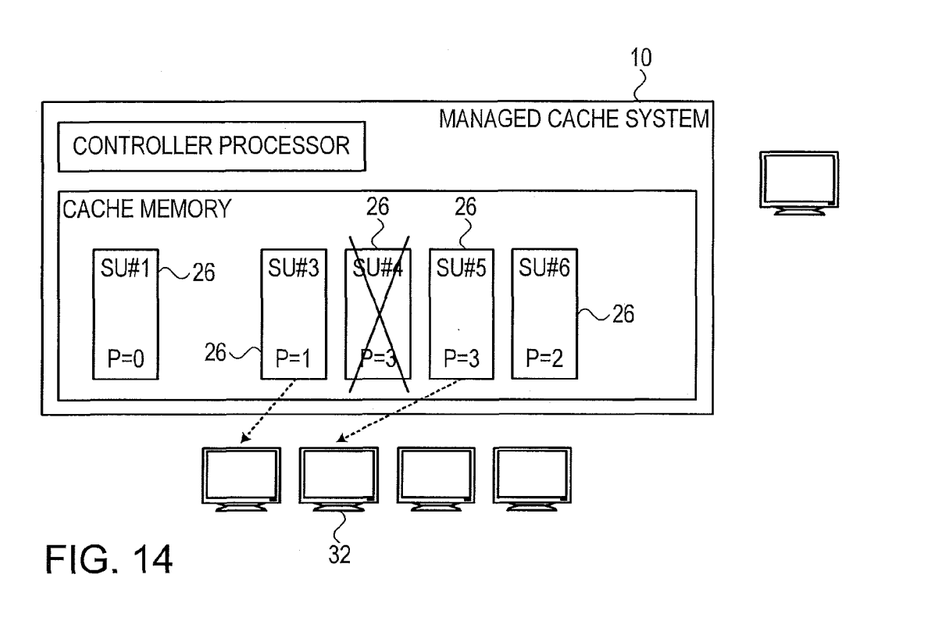
FIG. 14 is a partly pictorial, partly block diagram view illustrating purging of a storage unit in the managed cache system of FIG. 1.

Reference is now made to FIG. 14, which is a partly pictorial, partly block diagram view illustrating purging of a storage unit 26 (SU#4) in the managed cache system 10 of FIG. 1.

Once SU#6 has been uploaded, SU#4 can be purged from the cache memory 24 as SU#4 has priority 3 and SU#6 has priority 2 which is higher. SU#5 cannot be deleted at present, even though it also has a lower priority than SU#4, as SU#5 is still being downloaded by the client 32.

Figure 15:
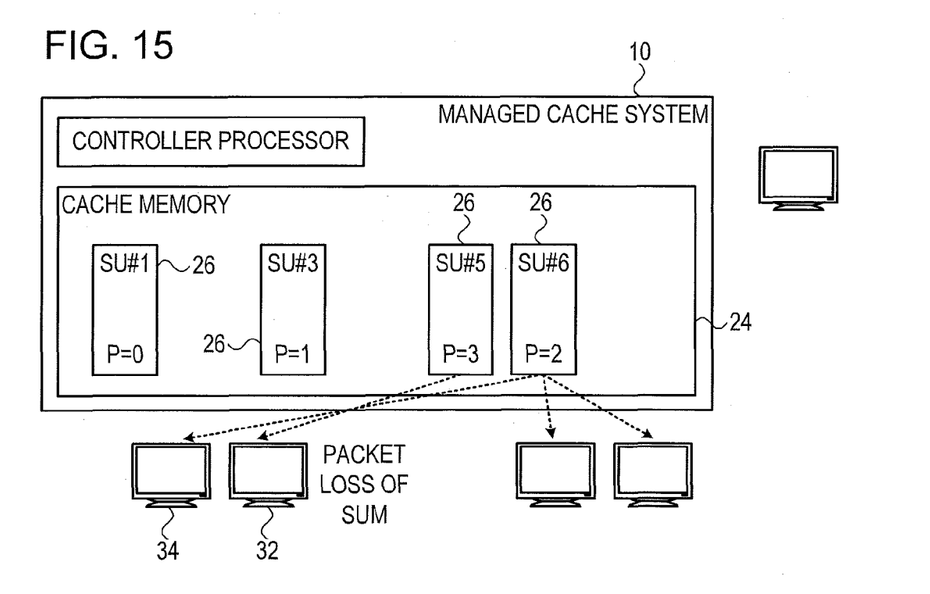
FIG. 15 is a partly pictorial, partly block diagram view illustrating packet loss in the managed cache system of FIG. 1.

Reference is now made to FIG. 15, which is a partly pictorial, partly block diagram view illustrating packet loss in the managed cache system 10 of FIG. 1.

The client 34 chooses the next storage unit 26 with the highest priority for download after downloading the current storage unit 26 in the cache memory 24. This is illustrated in FIG. 15, whereby after the client 34 finishes downloading SU#1, the client 34 skips SU#5 (with priority 3) and continues downloading SU#6 with priority 2, while the client 32 is still downloading SU#5 with priority 3.

Package loss and recovery is now discussed below.

A reliable link may be more suitable than a lossy network in a screen sharing scenario since the price of retransmission could be high because of the large data volume resulting from large screen resolution. However, a lossy network may also be used with the managed cache system 10. The purging mechanism of the managed cache system 10 generally allows recovery from error and limits errors from propagating. As shown in FIG. 15, if complete download of SU#5 by the client 32 fails, the error propagation stops at SU#6, since SU#6 does not depend on SU#5 for video decoding purposes. The client 32 can either attempt to re-download SU#5 or simply continue with SU#6.

It should be noted that skipping downloading of SU#5 by the client 34 is planned in accordance with the downloading rules of the cache memory 24 whereas termination of downloading of SU#5 by the client 32 is due to downloading error(s).

It should be noted that if downloading of a priority 0 storage unit 26 fails, then the priority 0 storage unit 26 may be retransmitted or the downloading client may skip other storage unit(s) 26 in the cache memory 24 to downloading a newer priority 0 storage unit 26 if one exists in the cache.

Figure 16:
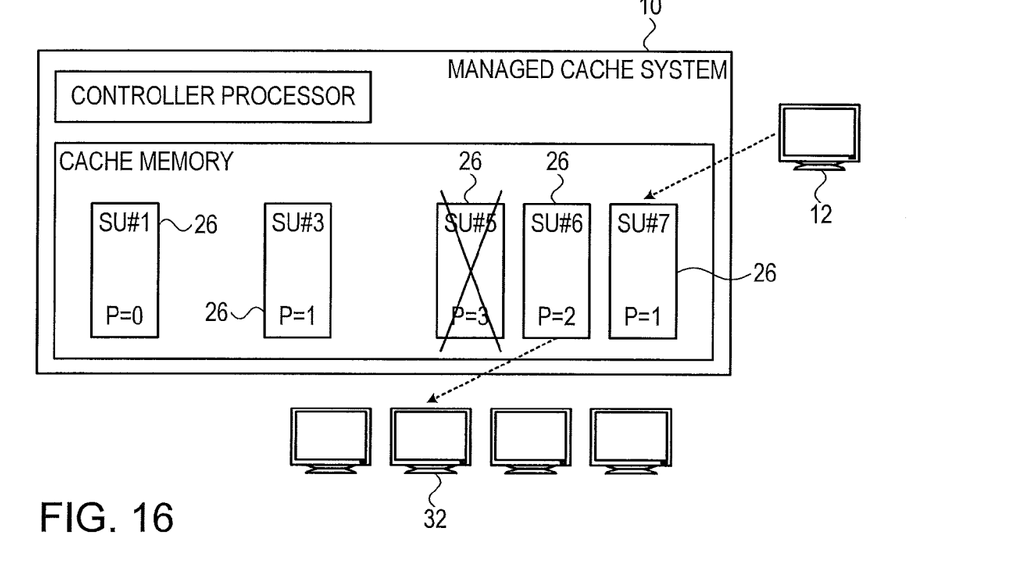
FIG. 16 is a partly pictorial, partly block diagram view illustrating further purging in the managed cache system of FIG. 1.

Reference is now made to FIG. 16, which is a partly pictorial, partly block diagram view illustrating further purging in the managed cache system 10 of FIG. 1.

FIG. 16 shows SU#5 being purged after client 32 finished downloading SU#5. FIG. 16 also shows the transmitting client 12 uploading another storage unit 26 (SU#7) with priority 1.

Figure 17:
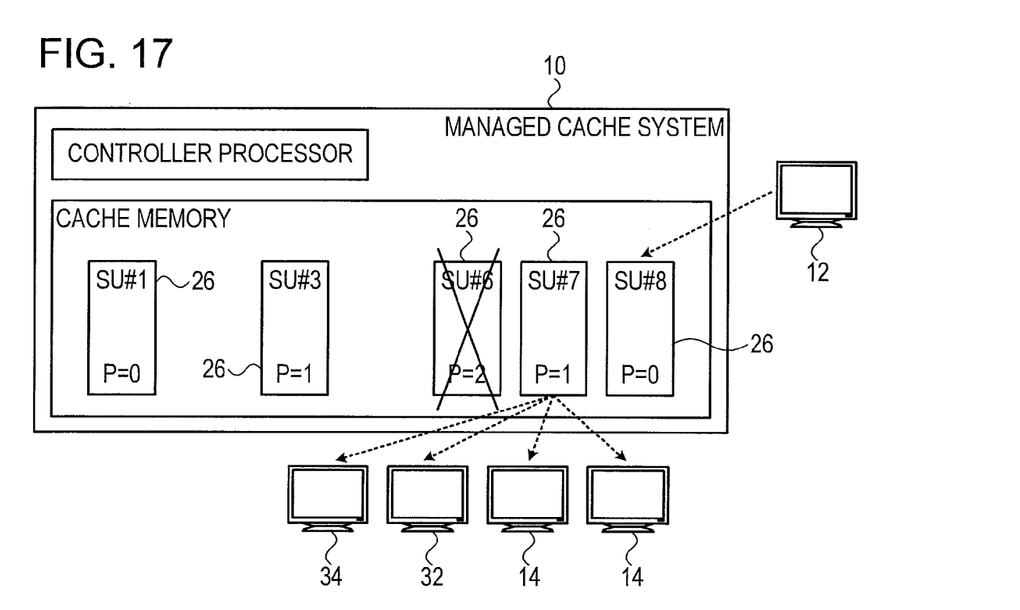
FIG. 17 is a partly pictorial, partly block diagram view illustrating uploading of a highest priority storage unit in the managed cache system of FIG. 1.

Reference is now made to FIG. 17.

FIG. 17 shows SU#6 being purged as SU#7 has a higher priority than SU#6 and SU#6 is not being downloaded. FIG. 17 also shows SU#7 being downloaded by the receiving clients 14, 32, 34.

FIG. 17 illustrates uploading of a highest priority storage unit 26 (SU#8) by the transmitting client 12 in the managed cache system 10 of FIG. 1.

Figure 18:
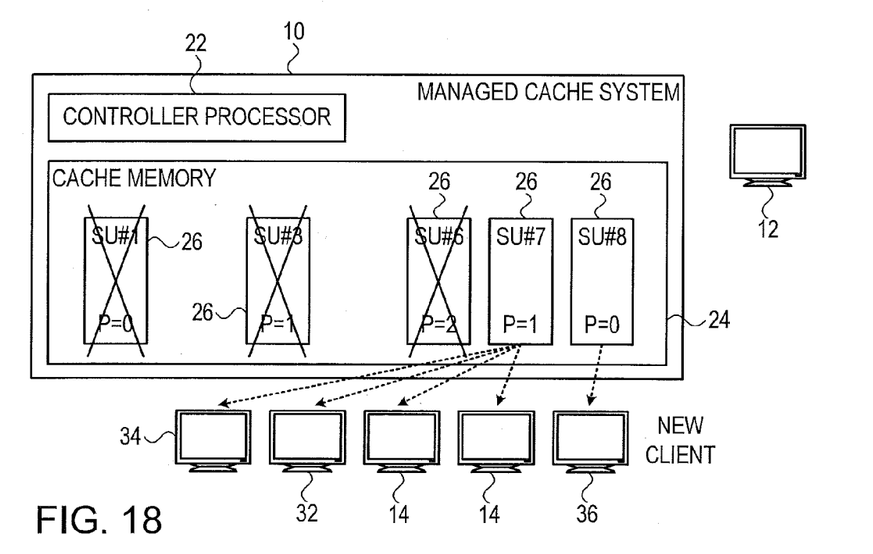
FIG. 18 is a partly pictorial, partly block diagram view of another new client joining in the managed cache system of FIG. 1.

Reference is now made to FIG. 18, which is a partly pictorial, partly block diagram view of another new client 36 joining the screen sharing in the managed cache system 10 of FIG. 1.

FIG. 18 shows that SU#8 is now disposed in the cache memory 24. SU#8 has priority 0 and is a random access point in the video sequence conveying the screen sharing.

Once a new storage unit 26 with priority 0 is disposed in the cache memory 24, all previous storage units 26 even with priority 0 can be purged from the cache memory 24 as long as the storage units 26 are not being downloaded or subject to a purging exclusion. Therefore, SU#1, SU#3 and SU#6 are now purged from the cache memory 24 by the controller processor 22.

The newly joining client 36 starts downloading SU#8 ahead of all the other receiving clients 14, 32, 34 which are still downloading SU#7 which is dependent from the previous random access point included in SU#1.

It should be noted that the generation of random access points by the transmitting client 12 may be independent of clients joining the screen sharing as shown in FIGS. 17 and 18. This independence provides a better user experience especially in large-scale conferencing when joining or continuous key picture requests are frequent.

Figure 19:
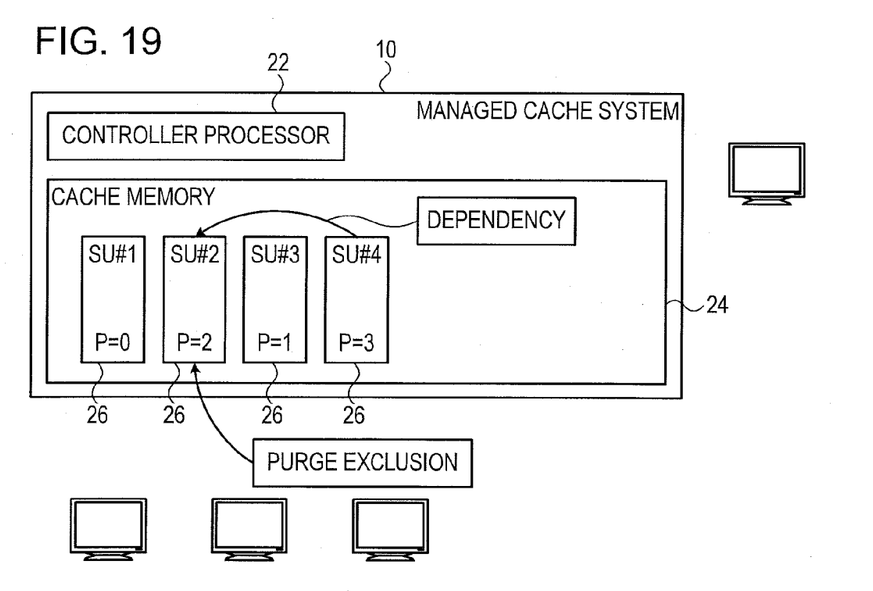
FIG. 19 is a partly pictorial, partly block diagram view illustrating purging exclusion in the managed cache system of FIG. 1.

Reference is now made to FIG. 19, which is a partly pictorial, partly block diagram view illustrating purging exclusion in the managed cache system 10 of FIG. 1.

The controller processor 22 may be operative to apply a purging exclusion to one or more priorities so that all the storage units 26 with the excluded priority (or priorities) are not purged. The controller processor 22 may be operative to revoke the purging exclusion when one or more conditions are fulfilled, for example, but not limited to, after expiration of a time period or on receipt of a storage unit 26 having a certain priority.

By way of example, in accordance with the H.265 video encoding standard, non-IDR frames before a Clean Random Access (CRA) frame may be used as reference by frame(s) after the Clean Random Access (CRA) frame. Therefore, the purging exclusion could be applied as follows. The storage units 26 with IDR frames could be assigned priority 0. The storage units 26 with CRA frames could be assigned priority 1. The storage units 26 with reference frames which are not IDR or CRA frames could be assigned priority 2. Additionally, priority 2 storage units 26 could then be subject to a purging exclusion until the next storage unit 26 including an IDR is received in the cache memory 24.

So in the example of FIG. 19, SU#2 which is a priority 2 storage unit 26 is not purged even though SU#3 has a higher priority of 1. Therefore, if a new client joins after SU#3 arrives in the cache memory 24, SU#2 is still available for download so that it can act as a reference frame for SU#4. SU#2 is only purged after the next priority 0 storage units 26 arrives in the cache memory 24.

By way of another example, the purging exclusion could be applied to a long term reference frame (LTRF) for a particular period of time.

It should be noted that the managed cache system 10 may be implemented with any suitable video encoding standard for example, but not limited to, H.264 AVC, H.264 SVC, HEVC or VP8.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A managed cache system, comprising:
a cache memory to:
receive a plurality of storage units via an uplink from a transmitting client, each of the plurality of storage units including a decodable video unit, each of the plurality storage units having a priority selected from a plurality of priorities, wherein;(i) a first storage unit of the plurality of storage units depends for video decoding purposes on at least one storage unit of the plurality of storage units having a higher priority of the plurality of priorities than a priority of the first storage unit;(ii) a second storage unit of the plurality of storage units depends for video decoding purposes on at least one storage unit of the plurality of storage units having a same priority of the plurality of priorities as a priority of the second storage unit; and (iii) each one storage unit of the plurality of storage units does not depend for video decoding purpose on ones of the plurality of storage units having a lower priority of the priorities than the priority of the one storage unit; and
enable downloading of the storage units via a plurality of downlinks to a plurality of receiving clients such that there is one of the downlinks for one of the receiving clients; and
a controller processor to purge the cache memory of one storage unit of the plurality of storage units when all of the following conditions are satisfied:
the one storage unit is not being downloaded to any of the receiving clients;
the one storage unit is not currently subject to a purging exclusion; and
a second storage unit of the plurality of storage units; (a) is now residing in the cache memory; (b) has a higher priority than the priority of the one storage unit; and (c) arrived in the cache memory after the one storage unit.

2. The system according to claim 1, wherein the controller processor is operative to store the received storage units in the cache memory according to a time of receipt of the received storage units in the cache memory.

3. The system according to claim 1, wherein the controller processor is operative to maintain a count of the number, or a list, of concurrent downloads of each of the storage units resident in the cache memory.

4. The system according to claim 1, wherein the storage units including independently decodable video unit are assigned to the highest priority of the priorities.

5. The system according to claim 1, wherein each of the storage units is not dependent for video decoding purposes on lower priority ones of the storage units.

6. The system according to claim 1, wherein one of the storage units, being a storage unit X, is dependent for video decoding purposes on at least one of the storage units, being one or more storage units Y, having the same priority as the storage unit X, as long as the cache memory does not include any other ones of the storage units having a higher priority than the storage unit X received in the cache memory before the storage unit X and received after the one or more storage units Y.

7. The system according to claim 1, wherein the cache memory is operative to receive the storage units via the uplink from the transmitting client with the priority of the storage units already assigned to each of the storage units.

8. The system according to claim 1, wherein the controller processor is operative to apply the purging exclusion to all of the storage units having certain of the priorities.

9. The system according to claim 8, wherein the controller processor is operative to revoke the purging exclusion when at least one condition is fulfilled.

10. The system according to claim 1 wherein the transmitting client is operative to share display screen content with the receiving clients using the storage units, the transmitting client being operative to transmit a new one of the storage units to the cache memory if the content changes whereas if the content does not change ,the transmitting client does not generate any storage units for transmitting to the cache memory.

11. A managed cache method, comprising:
receiving a plurality of storage units via an uplink from a transmitting client, each of the plurality storage units including a decodable video unit, each of the storage units having a priority selected from a plurality of priorities, wherein:(i) a first storage unit of the plurality of storage units depends for video decoding purposes on at least one storage unit of the plurality of storage units having a higher priority of the plurality of priorities than a priority of the first storage unit;(ii) a second storage unit of the plurality of storage units depends for video decoding purposes on at least one storage unit of the plurality of storage units having a same priority of the plurality of priorities as a priority of the second storage unit; and (iii) each one storage unit of the plurality of storage units does not depend for video decoding purpose on ones of the plurality of storage units having a lower priority of the priorities than the priority of the one storage units;
storing the plurality of storage units in a cache memory;
enabling downloading of the plurality of storage units from the cache memory via a plurality of downlinks to a plurality of receiving clients such that there is one of the downlinks for each of the receiving clients;
purging the cache memory of one of the storage unit of the storage units when all of the following conditions are satisfied:
the one storage unit is not being downloaded to any of the receiving clients;
the one storage unit is not currently subject to a purging exclusion; and
a second storage unit of the plurality of storage units; (a) is now residing in the cache memory; (b) has a higher priority than the priority of the one storage unit; and (c) arrived in the cache memory after the one storage unit.

12. The method according to claim 11, wherein the storing step comprises storing the received storage units in the cache memory according to a time of receipt of the received storage units in the cache memory.

13. The method according to claim 11, further comprising maintaining a count of the number, or a list, of concurrent downloads of each of the storage units resident in the cache memory.

14. The method according to claim 11, wherein the storage units including an independently decodable video unit are assigned to the highest priority of the priorities.

15. The method according to claim 11, wherein each of the storage units is not dependent for video decoding purposes on lower priority ones of the storage units.

16. The method according to claim 11, wherein one of the storage units, being a storage unit X, is dependent for video decoding purposes on at least one of the storage units, being one or more storage units Y, having the same priority as the storage unit X, as long as the cache memory does not include any other ones of the storage units having a higher priority than the storage unit X received in the cache memory before the storage unit X and received after the one or more storage units Y.

17. The method according to claim 11, wherein the receiving includes receiving the storage units via the uplink from the transmitting client with the priority of the storage units already assigned to each of the storage units.

18. The method according to claim 11, further comprising applying the purging exclusion to all of the storage units having a certain one of the priorities.

19. The method according to claim 18, further comprising revoking the purging exclusion when at least one condition is fulfilled.

20. The method according to claim 11, wherein the transmitting client is operative to share display screen content with the receiving clients using the storage units, the transmitting client being operative to transmit a new one of the storage units to the cache memory if the content changes whereas if the content does not change, the transmitting client does not generate any storage units for transmitting to the cache memory.

\* \* \* \* \*

UNITED STATES PATENT AND TRADEMARK OFFICE
CERTIFICATE OF CORRECTION

| | |
|---|---|
| PATENT NO. | : 9,723,099 B2 |
| APPLICATION NO. | : 14/272821 |
| DATED | : August 1, 2017 |
| INVENTOR(S) | : Sijia Chen et al. |

It is certified that error appears in the above-identified patent and that said Letters Patent is hereby corrected as shown below:

In the Specification

Column 1, Line 66, "cache," to read as --cache--.

In the Claims

Column 10, Line 16, Claim 1, "plurality storage" to read as --plurality of storage--.

Column 10, Line 17, Claim 1, "wherein;(i)" to read as --wherein: (i)--.

Column 10, Line 22, Claim 1, "unit;(ii)" to read as --unit; (ii)--.

Column 10, Line 29, Claim 1, "purpose" to read as --purposes--.

Column 10, Line 32, Claim 1, "the storage" to read as --the plurality of storage--.

Column 10, Line 43, Claim 1, "units;" to read as --units:--.

Column 10, Line 57, Claim 4, "including independently" to read as --including an independently--.

Column 11, Line 10, Claim 8, "having certain of" to read as --having a certain one of--.

Column 11, Line 14, Claim 10, "1" to read as --1,--.

Column 11, Line 19, Claim 10, "change ,the" to read as --change, the--.

Column 11, Line 24, Claim 11, "plurality storage" to read as --plurality of storage--.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,723,099 B2

Column 11, Line 25, Claim 11, "the storage" to read as --the plurality of storage--.

Column 11, Line 27, Claim 11, "wherein:(i)" to read as --wherein: (i)--.

Column 11, Line 31, Claim 11, "unit;(ii)" to read as --unit; (ii)--.

Column 11, Line 38, Claim 11, "purpose" to read as --purposes--.

Column 11, Line 40, Claim 11, "units;" to read as --unit;--.

Column 11, Line 46, Claim 11, "of one of the storage" to read as --of one storage--.

Column 12, Line 3, Claim 11, "units;" to read as --units:--.